(12) United States Patent
Ikeda

(10) Patent No.: US 6,729,938 B2
(45) Date of Patent: May 4, 2004

(54) CENTERLESS GRINDING MACHINE

(75) Inventor: Junzo Ikeda, Yao (JP)

(73) Assignee: Koyo Machine Industries Co., Ltd., Osaka (JP)

(*) Notice: Subject to any disclaimer, the term of this patent is extended or adjusted under 35 U.S.C. 154(b) by 0 days.

(21) Appl. No.: 10/030,154

(22) PCT Filed: May 23, 2001

(86) PCT No.: PCT/JP01/04341

§ 371 (c)(1),
(2), (4) Date: May 30, 2002

(87) PCT Pub. No.: WO01/91967

PCT Pub. Date: Dec. 6, 2001

(65) Prior Publication Data

US 2003/0032376 A1 Feb. 13, 2003

(30) Foreign Application Priority Data

May 29, 2000 (JP) .................................. 2000-157921
Jun. 16, 2000 (JP) .................................. 2000-180917

(51) Int. Cl.$^7$ ............................................ B24B 49/00
(52) U.S. Cl. ................... 451/14; 451/242; 451/243; 451/407
(58) Field of Search ................. 451/242, 243, 451/231, 407, 209, 11, 14, 15, 19

(56) References Cited

U.S. PATENT DOCUMENTS

| | | | |
|---|---|---|---|
| 5,558,567 A | | 9/1996 | Hedberg ..................... 451/242 |
| 5,749,273 A | * | 5/1998 | Rimlinger, Jr. ............... 82/1.11 |
| 5,766,057 A | * | 6/1998 | Maack ........................ 451/21 |
| 5,928,061 A | * | 7/1999 | Niino et al. .................. 451/14 |
| 6,123,605 A | * | 9/2000 | Yano ......................... 451/49 |

FOREIGN PATENT DOCUMENTS

| | | |
|---|---|---|
| JP | 1-66953 | 4/1989 |
| JP | 2-212056 | 8/1990 |
| JP | 8-52631 | 2/1996 |
| JP | 9-11097 | 1/1997 |
| JP | 63-180436 | 7/1998 |
| JP | 10-328984 | 12/1998 |

OTHER PUBLICATIONS

International Search Report dated Sep. 4, 2001

* cited by examiner

Primary Examiner—Eileen P. Morgan
(74) Attorney, Agent, or Firm—Westerman, Hattori, Daniels & Adrian, LLP

(57) ABSTRACT

A centerless grinder 1 according to the present invention comprises a bed 108, a grinding wheel spindle stock 101, a regulating wheel spindle stock 102, a work rest 103, and the like. The grinding wheel spindle stock 101 and the regulating wheel spindle stock 102 are respectively moved toward and away from each other by feed devices 10, 10. The feed devices 10, 10 respectively comprise feed screws 11, 11 each having one end fixed to the work rest 103. Nuts 12, 12 are respectively retained in the grinding wheel spindle stock 101 and the regulating wheel spindle stock 102 in threading engagement with the feed screws 11, 11 so that axial movements thereof along the feed screws 11 are restricted and rotational movements thereof about axes thereof are permitted. The nuts 12, 12 are respectively rotated by driving motors 15, 15. In the centerless grinder 1, the feed screws 11, 11 are fixed to the work rest 103 and, therefore, even if the bed 108 is thermally deformed by heat generated during grinding, a reduction in machining accuracy can be minimized.

8 Claims, 9 Drawing Sheets

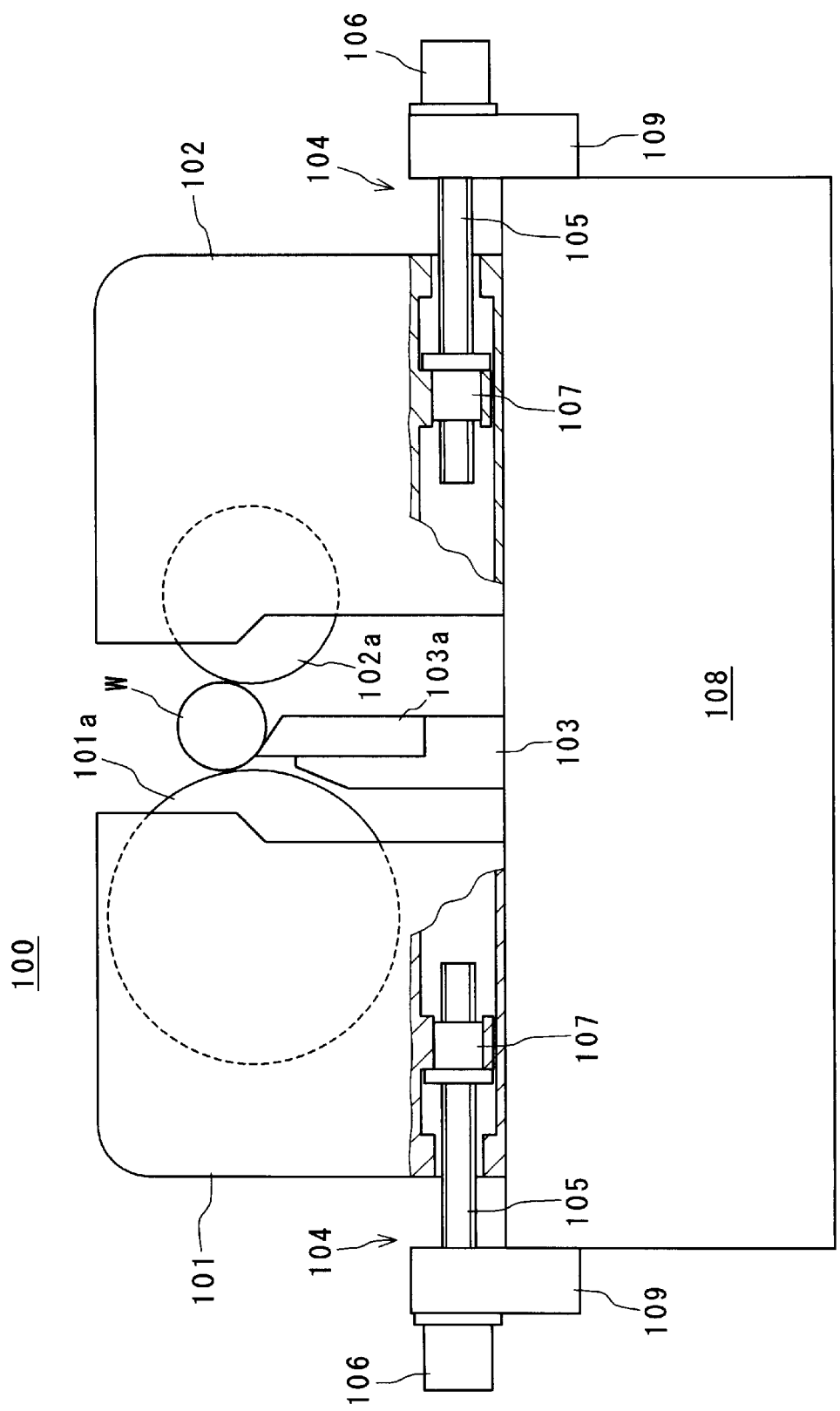

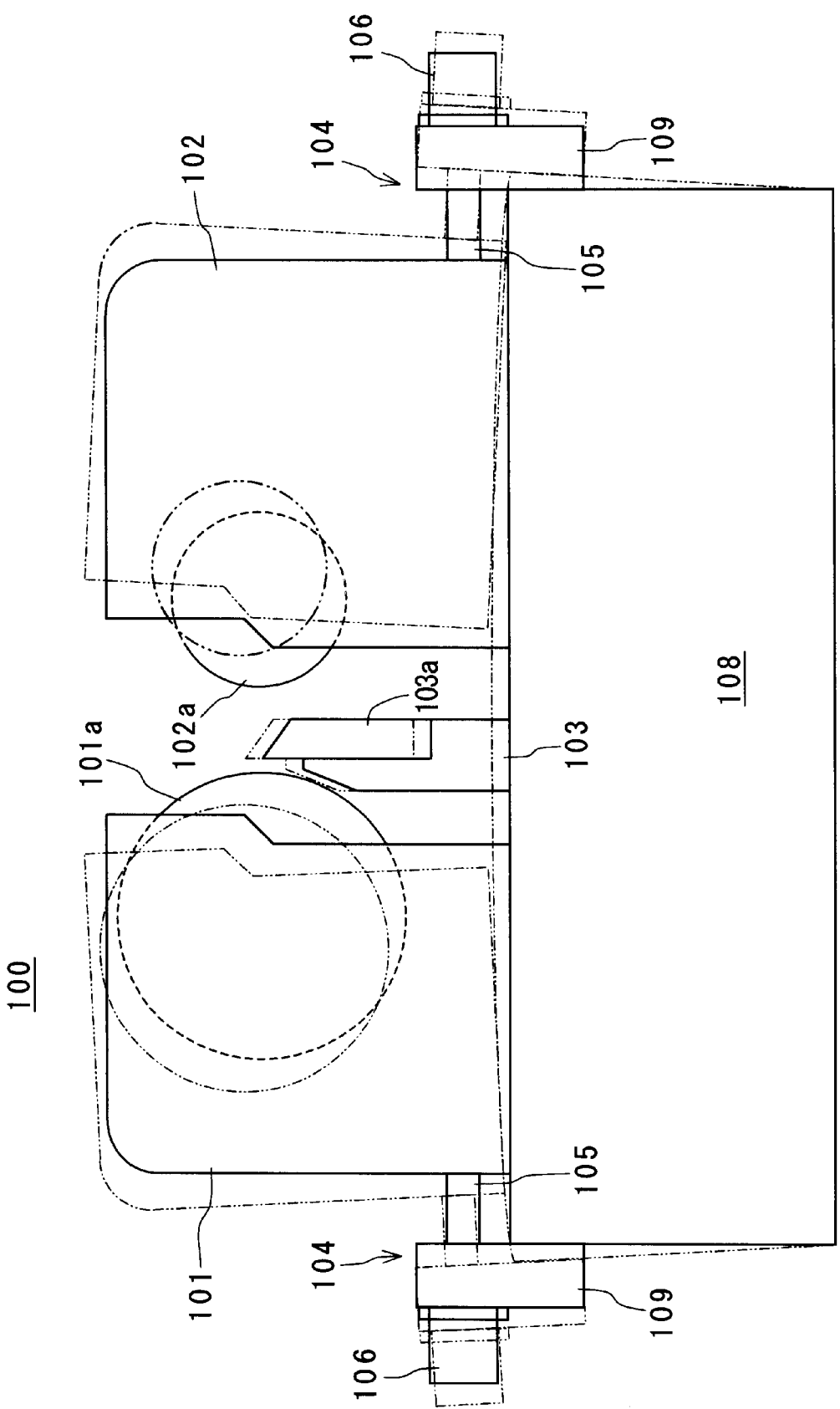

CENTERLESS GRINDING MACHINE

TECHNICAL FIELD

The present invention relates to a centerless grinder which comprises a grinding wheel spindle stock and a regulating wheel spindle stock disposed in opposed relation, and a work rest disposed between the grinding wheel spindle stock and the regulating wheel spindle stock.

BACKGROUND ART

One exemplary centerless grinder of the aforesaid type is shown in FIG. 9. FIG. 9 is a front view illustrating the centerless grinder partly in section. As shown in FIG. 9, the centerless grinder 100 includes a bed 108, a grinding wheel spindle stock 101 disposed on the bed 108 and having a grinding wheel 101a, a regulating wheel spindle stock 102 disposed in opposed relation to the grinding wheel spindle stock 101 and having a regulating wheel 102a, a work rest 103 disposed between the grinding wheel spindle stock 101 and the regulating wheel spindle stock 102 and having a blade 103a for supporting a workpiece W, feed devices 104, 104 for moving the grinding wheel spindle stock 101 and the regulating wheel spindle stock 102, and the like. By the operations of the feed devices 104, 104, the grinding wheel spindle stock 101 and the regulating wheel spindle stock 102 are moved toward and away from each other.

The feed devices 104, 104 include feed screws 105, 105 respectively disposed as extending in the directions of the movements of the grinding wheel spindle stock 101 and the regulating wheel spindle stock 102, driving motors 106, 106 for respectively rotating the feed screws 105, 105 about axes thereof, nuts 107, 107 respectively fixed to the grinding wheel spindle stock 101 and the regulating wheel spindle stock 102 in threading engagement with the feed screws 105, 105, and the like.

Brackets 109, 109 fixed to opposite sides of the bed 108 respectively hold the feed screws 105, 105 so as to restrict the axial movements thereof and permit the rotational movements thereof about the axes thereof. The feed screws 105, 105 are respectively rotated by the driving motors 106, 106, whereby the grinding wheel spindle stock 101 and the regulating wheel spindle stock 102 are moved toward and away from each other.

Thus, the feed devices 104, 104 are respectively driven to properly move the grinding wheel spindle stock 101 and the regulating wheel spindle stock 102, so that the workpiece W is supported by the grinding wheel spindle stock 101, the regulating wheel spindle stock 102 and the work rest 103, and the workpiece W has a predetermined depth of grinding. Then the workpiece W is thrown between the grinding wheel 101a and the regulating wheel 102a which are now rotating. Thus, the workpiece W is ground by the grinding wheel 101a.

When the workpiece W is ground by the centerless grinder 100, a grinding liquid is supplied to a grinding part so as to cool the grinding part. Heat generated during the grinding is absorbed by the grinding liquid to increase the temperature of the grinding liquid. Where the temperature of the grinding liquid is 20° C. immediately after the start of the machining, for example, the grinding liquid is heated up to about 35° C. to about 40° C. after a lapse of 20 to 30 minutes from the start of the machining.

The grinding liquid supplied to the grinding part generally drops on the bed 108, and then is collected in a storage tank. Therefore, the temperature of an upper portion of the bed 108 is increased by the grinding liquid having dropped on the bed 108. On the other hand, a lower portion of the bed 108 is less susceptible to the increase in the temperature of the grinding liquid. Hence, the upper portion of the bed 108 is more liable to be thermally deformed than the lower portion of the bed 108 as shown in FIG. 10. In FIG. 10, the thermal deformation of the bed 108 is exaggerated for purpose of illustration, and an initial state immediately after the machining and a thermally deformed state are indicated by a continuous line and a chain double-dashed line, respectively.

As shown, the upper portion of the bed 108 is thermally deformed to be convexly curved upward. Since the grinding wheel spindle stock 101 and the regulating wheel spindle stock 102 disposed on the bed 108 are upwardly offset and the feed screws 105 are held on the opposite sides of the bed 108, the grinding wheel spindle stock 101 and the regulating wheel spindle stock 102 are displaced away from each other by the thermal expansion of the upper portion of the bed 108. Therefore, the centerless grinder 100 having the aforesaid construction conventionally suffers from a problem such that the grinding dimensional accuracy is remarkably reduced by the thermal deformation.

In view of the foregoing, it is an object of the present invention to provide a centerless grinder which can minimize the reduction in machining accuracy even if the bed is thermally deformed by the heat generated during the grinding.

DISCLOSURE OF THE INVENTION

In accordance with the present invention, there is provided a centerless grinder, which comprises: a bed; a grinding wheel spindle stock and a regulating wheel spindle stock disposed on the bed in opposed relation; a work rest fixed on the bed between the grinding wheel spindle stock and the regulating wheel spindle stock for supporting a workpiece between the grinding wheel spindle stock and the regulating wheel spindle stock; at least one of the grinding wheel spindle stock and the regulating wheel spindle stock serving as a feedable wheel spindle stock which is movable in a direction toward and away from the other wheel spindle stock; and a feed device for moving the feedable wheel spindle stock in the direction, wherein the feed device comprises: a feed screw having one end fixed onto the bed between the grinding wheel spindle stock and the regulating wheel spindle stock, and disposed as extending in the direction of the movement; a nut retained in the feedable wheel spindle stock in threading engagement with the feed screw so that an axial movement thereof along the feed screw is restricted and a rotational movement thereof about an axis thereof is permitted; and a driving motor for rotating the nut about the axis thereof.

In the centerless grinder, the one end of the feed screw is fixed onto the bed and, when the nut is rotated about the axis thereof by the driving motor, the nut threadingly engaged with the feed screw and the feedable wheel spindle stock retaining the nut are moved along the feed screw. The one end of the feed screw is thus fixed onto the bed between the grinding wheel spindle stock and the regulating wheel spindle stock and, therefore, even if the bed is thermally expanded by heat generated during the grinding, the nut threadingly engaged with the feed screw and the feedable wheel spindle stock retaining the nut are kept in a proper positional relationship with respect to the feed screw by the threading engagement with the feed screw irrespective of the thermal expansion of the bed. As a result, the positional relationship between the grinding wheel spindle stock and the regulating wheel spindle stock is properly maintained.

The inventive centerless grinder is free from a significant change in the positional relationship between the grinding wheel spindle stock and the regulating wheel spindle stock, which often occurs due to the thermal deformation of the bed in the conventional centerless grinder in which the feed screws are retained on the sides of the bed. Therefore, the inventive centerless grinder provides an effect of minimizing the reduction in the machining accuracy of the workpiece which may occur due to the thermal deformation of the bed.

The centerless grinder may be constructed such that the grinding wheel spindle stock and the regulating wheel spindle stock respectively serve as feedable wheel spindle stocks which are movable in a direction toward and away from each other, wherein the feed device comprises: a single feed screw disposed as extending in the direction of the movements of the feedable wheel spindle stocks and having a middle portion fixed onto the bed between the grinding wheel spindle stock and the regulating wheel spindle stock; a first nut retained in the grinding wheel spindle stock in threading engagement with one side of the feed screw so that an axial movement thereof along the feed screw is restricted and a rotational movement thereof about an axis thereof is permitted; a second nut retained in the regulating wheel spindle stock in threading engagement with the other side of the feed screw so that an axial movement thereof along the feed screw is restricted and a rotational movement thereof about an axis thereof is permitted; a first driving motor for rotating the first nut about the axis thereof; and a second driving motor for rotating the second nut about the axis thereof.

In the centerless grinder, the middle portion of the feed screw is retained on the bed between the grinding wheel spindle stock and the regulating wheel spindle stock and, therefore, when the first nut and the second nut are respectively rotated about the axes thereof by the first driving motor and the second driving motor, the first nut and the second nut threadingly engaged with the feed screw and the grinding wheel spindle stock and the regulating wheel spindle stock respectively retaining the first nut and the second nut are moved along the feed screw.

The single feed screw is retained on the bed between the grinding wheel spindle stock and the regulating wheel spindle stock as described above and, therefore, even if the bed is thermally expanded by heat generated during the grinding, the first nut and the second nut threadingly engaged with the feed screw and the grinding wheel spindle stock and the regulating wheel spindle stock respectively retaining the first nut and the second nut are kept in proper positional relationships with respect to the feed screw by the threading engagement with the feed screw irrespective of the thermal expansion of the bed. As a result, the positional relationship between the grinding wheel spindle stock and the regulating wheel spindle stock is properly maintained. Thus, the reduction in the machining accuracy of the workpiece can be minimized which may occur due to the thermal deformation of the bed.

The feed screw may be fixed to the work rest, a retainer provided on the bed as a part thereof or an additional component fixed onto the bed.

The single feed screw may be retained in a slightly axially and/or radially movable manner by the retainer, the work rest or the additional component fixed onto the bed.

In general, the grinding wheel spindle stock and the regulating wheel spindle stock are guided by proper guiding means so as to be movable toward and away from each other. Where the grinding wheel spindle stock and the regulating wheel spindle stock are adapted to be moved by the single feed screw as described above and the feed screw is fixed onto the bed, it would be necessary to precisely align the guide means for guiding the grinding wheel spindle stock and the regulating wheel spindle stock with the first nut and the second nut respectively retained in the grinding wheel spindle stock and the regulating wheel spindle stock. Without proper alignment, the grinding wheel spindle stock and the regulating wheel spindle stock could not smoothly be moved. As a result, the feed screw, the first nut and the second nut, or the guide means would abnormally be worn, thereby presenting a problem such as deterioration in grinding accuracy. Further, the precise alignment of the guide means with the first nut and the second nut would be troublesome, and adjustment for the alignment would be time-consuming.

In the centerless grinder having the aforesaid construction, the feed screw is allowed for slight axial and/or radial movement. Even if the guide means is slightly misaligned with the first nut and the second nut, the misalignment is accommodated by the slight movement. Therefore, the grinding wheel spindle stock and the regulating wheel spindle stock can smoothly be moved without the precise alignment of the guide means with the first nut and the second nut. Even if the bed is thermally deformed to be curved, the deformation is accommodated by the slight movement, so that deformation of the feed screw can be prevented which may otherwise occur due to the thermal deformation of the bed.

For the retention of the feed screw, the feed screw has a flange formed around the middle portion thereof and having at least two through-holes formed therein as extending therethrough axially of the feed screw, and tubular sleeves each having a length greater than the thickness of the flange are respectively loosely fitted in the through-holes and fixed to the retainer or the work rest by fixing bolts. With this relatively simple arrangement, the feed screw is allowed for slight axial and radial movements.

The first nut and the second nut may respectively be retained in the grinding wheel spindle stock and the regulating wheel spindle stock via thrust bearings each having an aligning function. With this arrangement, a load exerted on the feed screw is alleviated by the aligning function, even if the feed screw is misaligned with the thrust bearings. As a result, the feed screw is prevented from being bent or deformed.

Preferably, the driving motors are respectively fixed to the feedable wheel spindle stocks.

The feed screw is preferably composed of a material having a coefficient of linear expansion smaller than that of the bed. If the feed screw is thermally expanded, the thermal expansion directly influences a spacing between the grinding wheel spindle stock and the regulating wheel spindle stock, so that the finished workpiece may have a dimensional error. Therefore, the feed screw is preferably composed of a material having a smallest possible coefficient of linear expansion, and desirably composed of a material having a coefficient of linear expansion smaller than at least that of the bed. To this end, it is further preferred that the feed screw is composed of a material having a coefficient of linear expansion of not greater than $4.0 \times 10^{-6}/° C$.

BRIEF DESCRIPTION OF THE DRAWINGS

FIG. 9 is a front view illustrating partly in section a conventional centerless grinder; and FIG. 10 is an explanatory diagram illustrating a bed of the centerless grinder shown in FIG. 9 in a thermally deformed state.

BEST MODE FOR CARRYING OUT THE INVENTION

Figure 1:
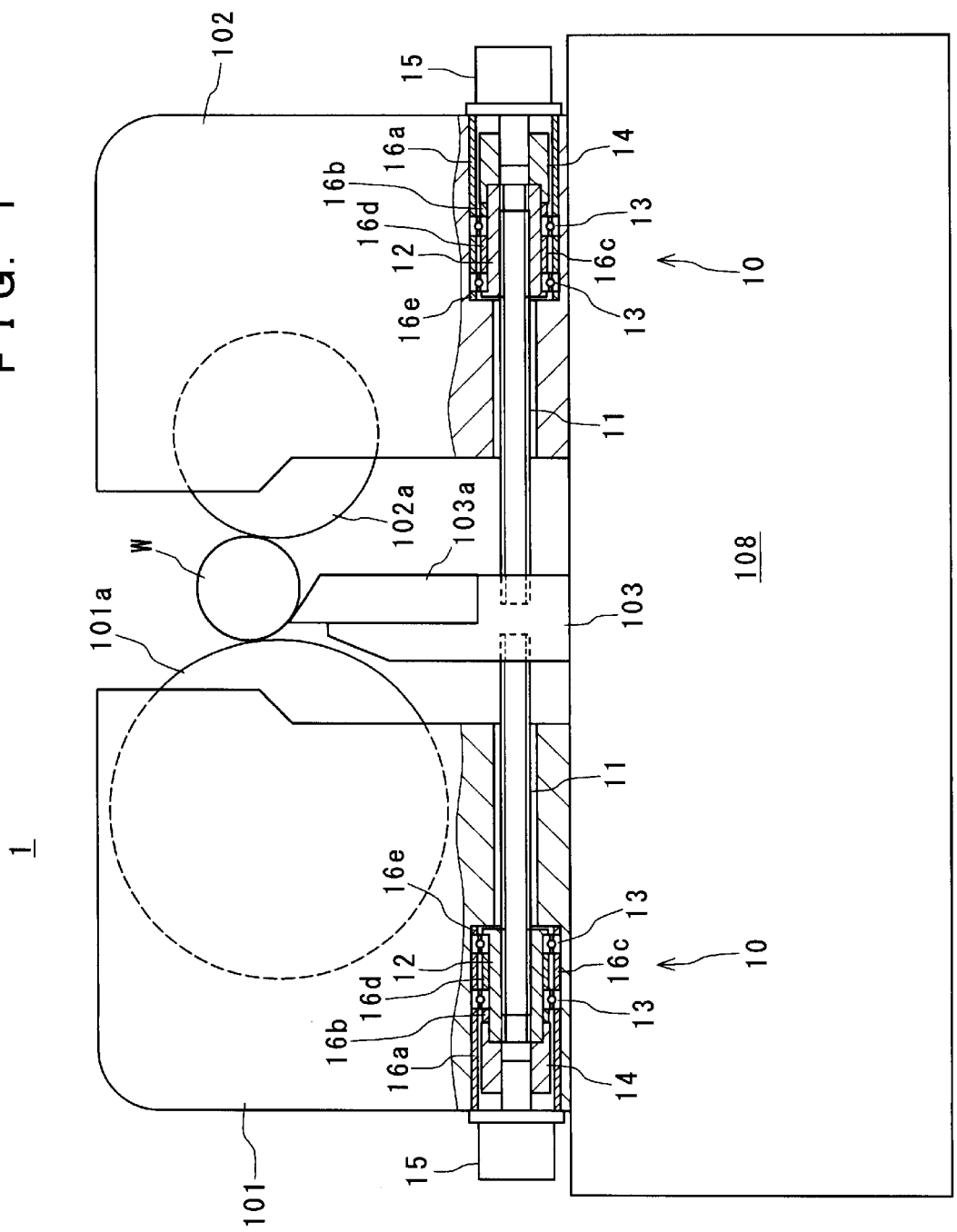
FIG. 1 is a front view illustrating partly in section a centerless grinder according to one embodiment of the present invention.

Specific embodiments of the present invention will hereinafter be described with reference to the attached drawings. FIG. 1 is a front view illustrating partly in section a centerless grinder according to an embodiment of the present invention.

As shown in FIG. 1, the centerless grinder 1 according to this embodiment has an improvement over the conventional centerless grinder 100 shown in FIG. 9, and feed devices 10 thereof are different in construction from the feed devices 104 of the conventional centerless grinder 100. Therefore, components having the same construction as those of the conventional centerless grinder 100 are denoted by the same reference characters, and a detailed explanation will not be given thereto. The feed devices 10, 10 have the same construction. Therefore, one of the feed devices 10 which is adapted to drive the grinding wheel spindle stock 101 will typically be dealt with for convenience of explanation of the construction of the feed devices 10.

As shown in FIG. 1, the feed device 10 of the centerless grinder 1 according to this embodiment includes a feed screw 11 having one end fixed to the work rest 103 and disposed as extending in the direction of the movement of the grinding wheel spindle stock 101, a nut 12 threadingly engaged with the feed screw 11, and the like.

The nut 12 is retained rotatably about an axis thereof in the grinding wheel spindle stock 101 by two bearings 13, 13, and an axial movement thereof is restricted by spacers 16a, 16b, 16c, 16d, 16e and the like. A driving motor 15 for rotating the nut 12 about the axis thereof is connected to the nut 12 via a coupling 14. The driving motor 15 is fixed to the grinding wheel spindle stock 101.

When the nut 12 is rotated about the axis thereof by the driving motor 15, the nut 12 is axially moved with respect to the feed screw 11. As a result, the grinding wheel spindle stock 101 is moved together with the nut 12 and the driving motor 15 along the feed screw 11.

In the centerless grinder 1, the feed devices 10, 10 are respectively thus driven to properly move the grinding wheel spindle stock 101 and the regulating wheel spindle stock 102, so that a workpiece W is supported by the grinding wheel spindle stock 101, the regulating wheel spindle stock 102 and the work rest 103, and the workpiece W has a predetermined depth of grinding. Then the workpiece W is thrown between the grinding wheel 101a and the regulating wheel 102a which are now rotating. Thus, the workpiece W is ground by the grinding wheel 101a.

Figure 2:
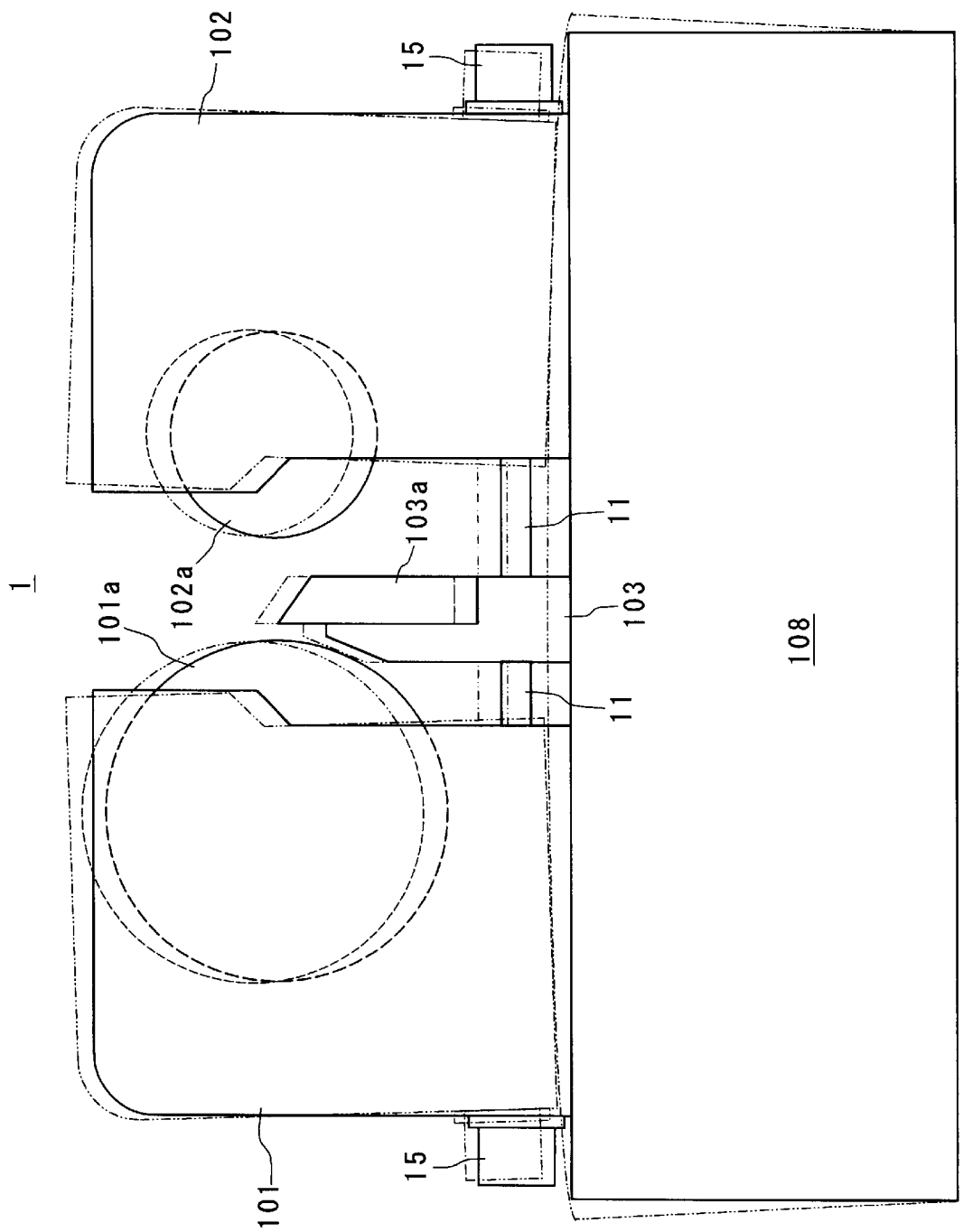
FIG. 2 is an explanatory diagram illustrating a bed of the centerless grinder in a thermally deformed state.

When the bed 108 is thermally deformed by a heated grinding liquid after the centerless grinder 1 operates for a predetermined period, the centerless grinder 1 assumes a state as indicated by a chain double-dashed line in FIG. 2. That is, the upper portion of the bed 108 is heated and significantly thermally expanded by the grinding liquid having dropped on the upper portion thereby to be convexly curved upward. Therefore, the grinding wheel spindle stock 101 and the regulating wheel spindle stock 102 provided on the bed 108 are upwardly offset together with the work rest 103.

On the other hand, the ends of the feed screws 11, 11 are fixed to the work rest 103 provided on the center of the bed 108, so that the positional relationships of the grinding wheel spindle stock 101 and the regulating wheel spindle stock 102 with respect to the feed screws 11, 11 are maintained by the threading engagement with the feed screws 11, 11 irrespective of the thermal expansion of the bed 108. As a result, an inter-axis distance between the grinding wheel 101a and the regulating wheel 102a is not influenced by the thermal expansion of the bed 108, but is kept substantially at the initial level. This can easily be understood from a comparison of FIGS. 2 and 10. Thus, the centerless grinder 1 according to this embodiment can minimize the reduction in the machining accuracy of the workpiece W which may occur due to the thermal expansion of the bed 108.

Figure 3:
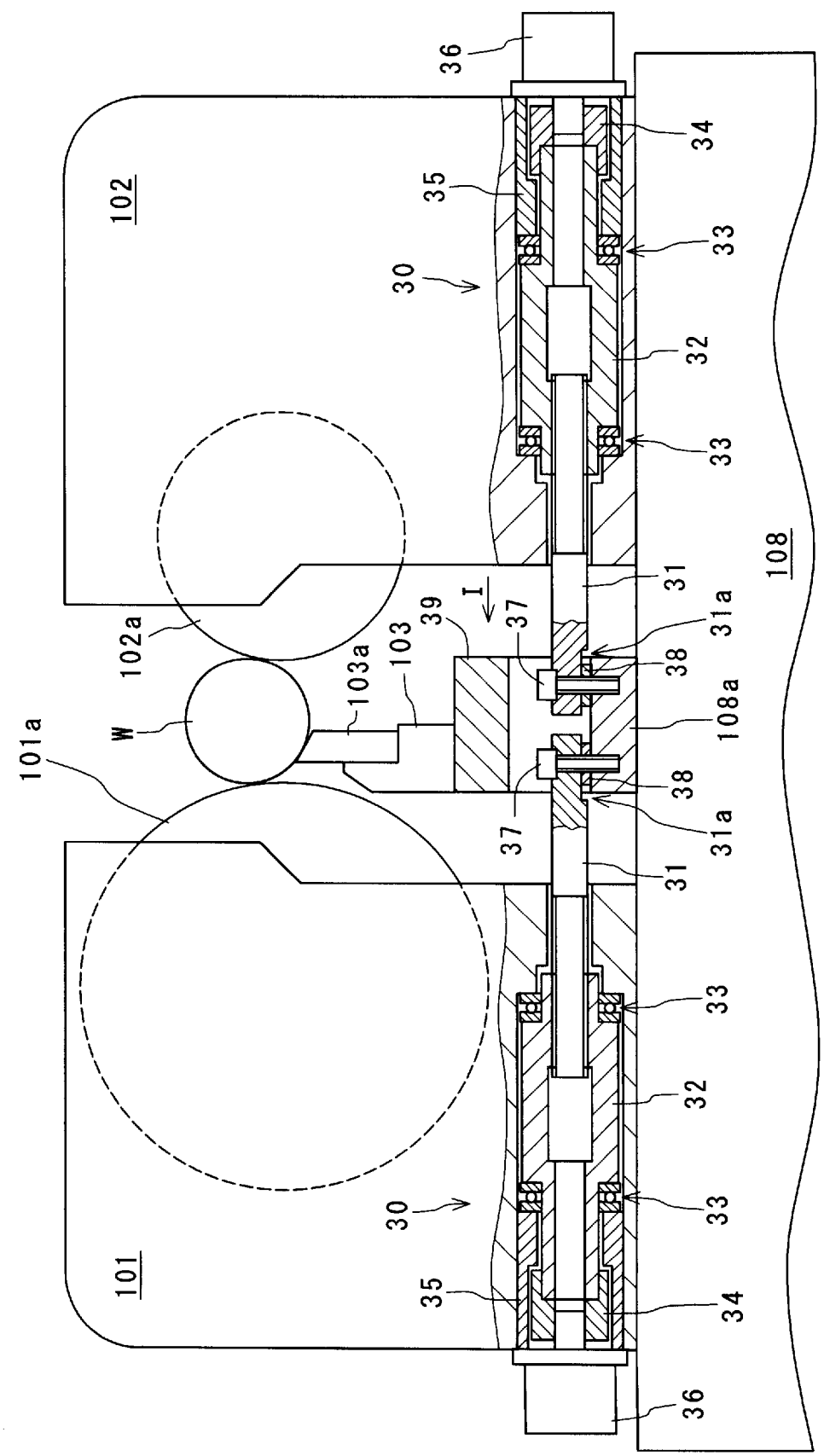
FIG. 3 is a front view illustrating partly in section a centerless grinder according to another embodiment of the present invention.

The present invention may be embodied as a centerless grinder as shown in FIG. 3. As in the aforesaid embodiment, components having the same construction as those of the conventional centerless grinder 100 are denoted by the same reference characters in FIG. 3. Feed devices 30, 30 of this centerless grinder 20 have the same construction. Therefore, one of the feed devices 30 which is adapted to drive the grinding wheel spindle stock 101 will typically be dealt with for convenience of explanation of the construction of the feed devices 30.

As shown in FIG. 3, the bed 108 of the centerless grinder 20 includes a retainer 108a formed as a part thereof on an upper surface thereof between the grinding wheel spindle stock 101 and the regulating wheel spindle stock 102. The retainer 108a is of a C-shape having two vertical portions and one horizontal portion as seen from the side, i.e., in an arrow direction I. A saddle 39 is fixed to upper surfaces of the two vertical portions as extending therebetween. The work rest 103 is placed on the top of the saddle 39, and fixed thereto.

The feed device 30 includes a feed screw 31 having one end fixed to the horizontal portion of the retainer 108a and disposed as extending in the direction of the movement of the grinding wheel spindle stock 101, a nut 32 threadingly engaged with the feed screw 31, and the like. The one end of the feed screw 31 fixed to the retainer 108a has a flat-finished lower surface 31a, and is fixed to the horizontal portion with the intervention of a washer 38 by a bolt 37.

The nut 32 is retained rotatably about an axis thereof in the grinding wheel spindle stock 101 by two bearings 33, 33, and an axial movement thereof is restricted by a spacer 35 and the like. A driving motor 36 for rotating the nut 32 about the axis thereof is connected to the nut 32 via a coupling 34. The driving motor 36 is fixed to the grinding wheel spindle stock 101.

When the nut 32 is rotated about the axis thereof by the driving motor 36, the nut 32 is axially moved with respect to the feed screw 31. As a result, the grinding wheel spindle stock 101 is moved together with the nut 32 and the driving motor 36 along the feed screw 31.

In the centerless grinder 20, the ends of the feed screws 31, 31 are fixed to the retainer 108a provided on the center of the bed 108, so that the positional relationships of the grinding wheel spindle stock 101 and the regulating wheel spindle stock 102 with respect to the feed screws 31, 31 are maintained by the threading engagement irrespective of the thermal expansion of the bed 108 as in the aforesaid centerless grinder 1. As a result, the inter-axis distance between the grinding wheel 101a and the regulating wheel 102a is not influenced by the thermal expansion of the bed 108, but is kept substantially at the initial level. Thus, the reduction in the machining accuracy of the workpiece W can be minimized which may occur due to the thermal deformation of the bed 108.

Figure 4:
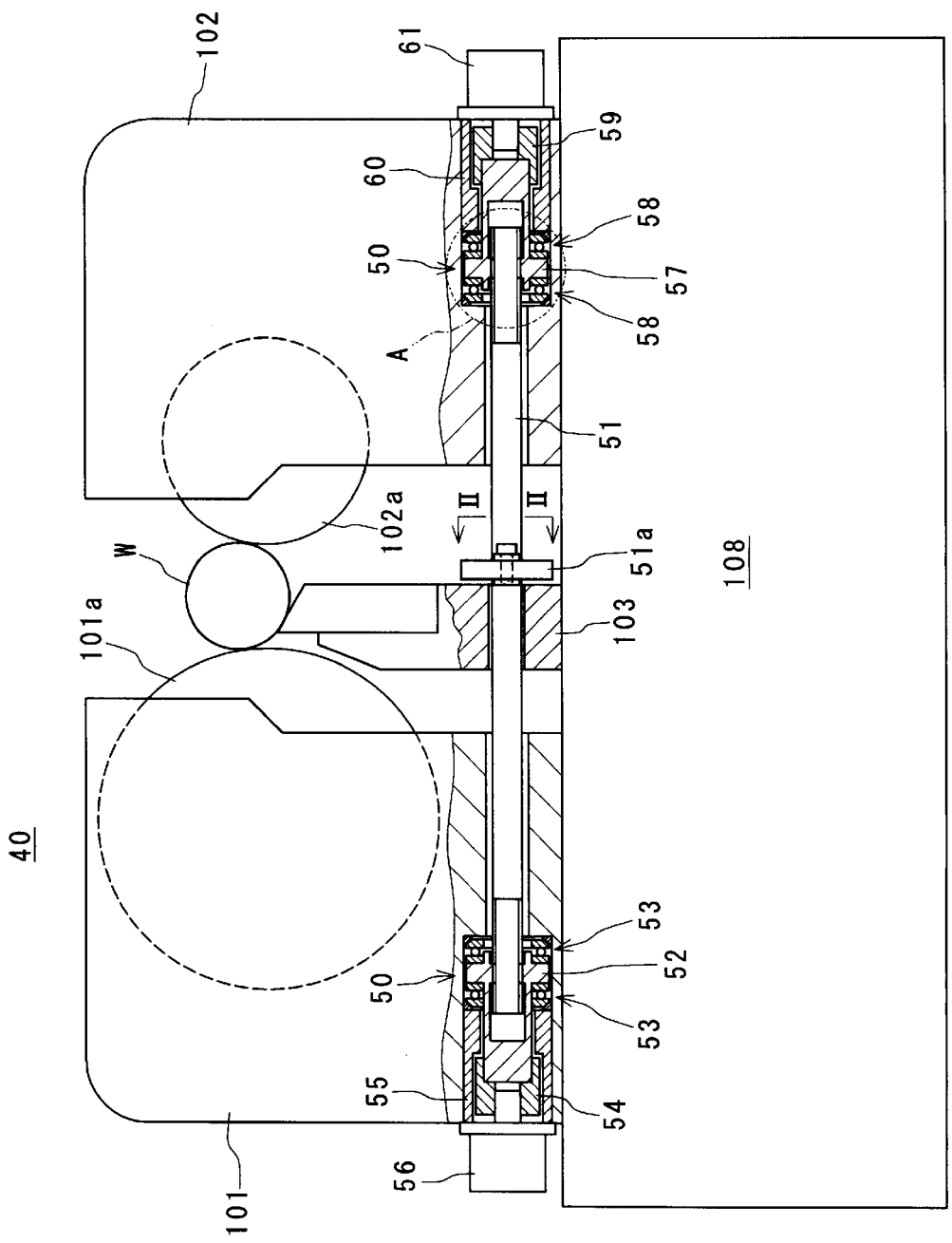
FIG. 4 is a front view illustrating partly in section a centerless grinder according to further another embodiment of the present invention.
Figure 5:
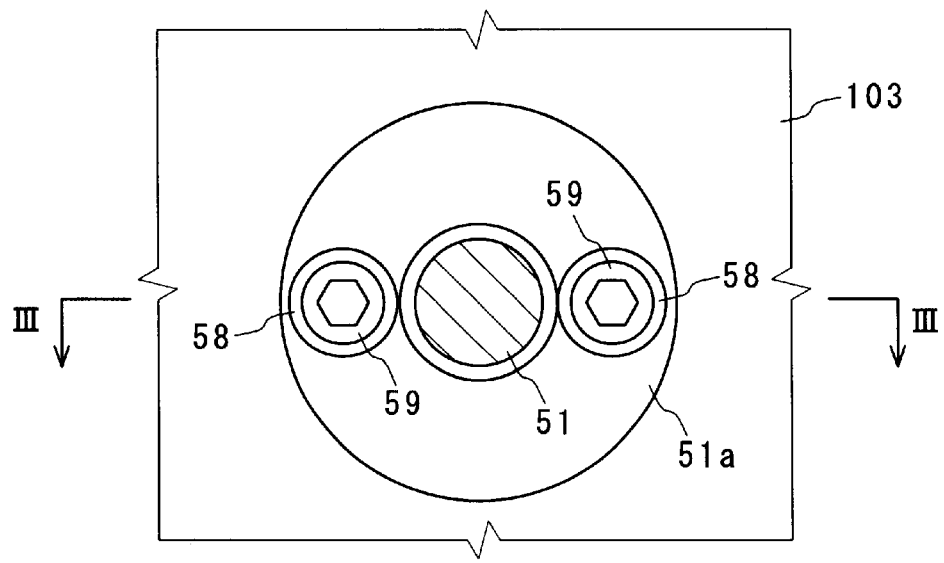
FIG. 5 is a sectional view taken as seen in an arrow direction II—II in FIG. 4.
Figure 6:
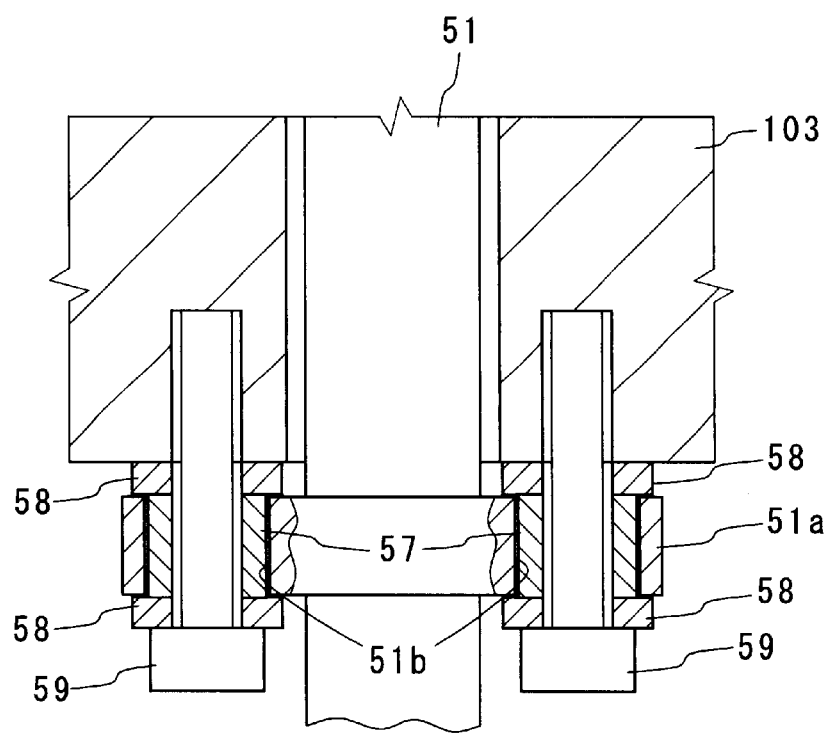
FIG. 6 is a sectional view taken as seen in an arrow direction III—III in FIG. 5.
Figure 7:
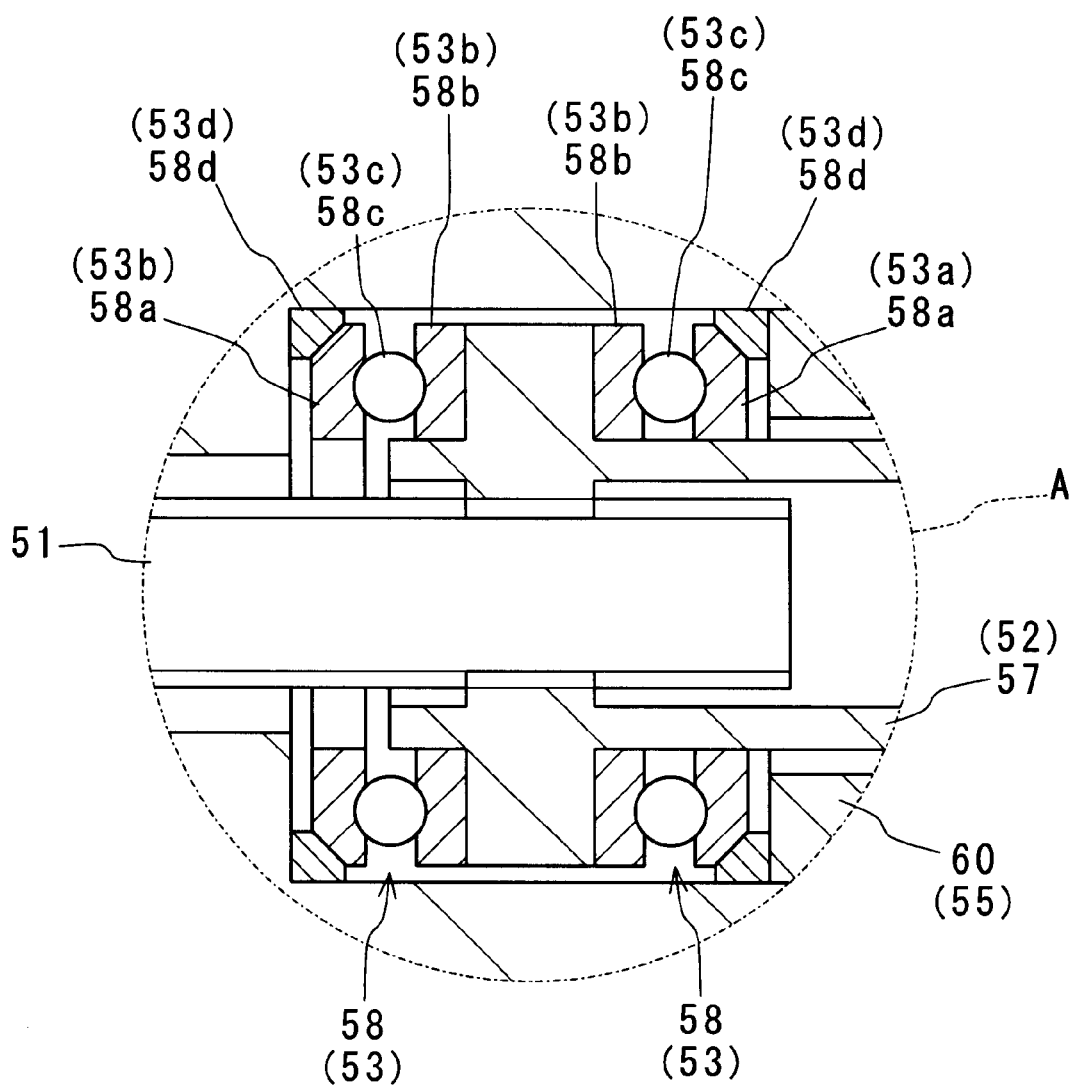
FIG. 7 is an enlarged sectional view illustrating a part A in FIG. 4 on a greater scale.

The present invention may be embodied as a centerless grinder as shown in FIG. 4. FIG. 4 is a front view illustrating partly in section the centerless grinder according to further another embodiment of the present invention. FIG. 5 is a sectional view taken as seen in an arrow direction II—II in FIG. 4, and FIG. 6 is a sectional view taken as seen in an arrow direction III—III in FIG. 5. FIG. 7 is an enlarged sectional view illustrating a part A in FIG. 4 on a greater scale. In FIGS. 4 to 7, components having the same construction as those of the conventional centerless grinder 100 are denoted by the same reference characters.

As shown in FIG. 4, a feed device 50 of this centerless grinder 40 includes a single feed screw 51 disposed as extending through the work rest 103 in the direction of the movements of the grinding wheel spindle stock 101 and the regulating wheel spindle stock 102, a first nut 52 retained in threading engagement with one side of the feed screw 51 in the grinding wheel spindle stock 101 so that an axial movement thereof along the feed screw 51 is restricted and a rotational movement thereof about an axis thereof is permitted, a second nut 57 retained in threading engagement with the other side of the feed screw 51 in the regulating wheel spindle stock 102 so that an axial movement thereof along the feed screw 51 is restricted and an rotational movement thereof about an axis thereof is permitted, a first driving motor 56 for rotating the first nut 52 about the axis thereof, and a second driving motor 61 for rotating the second nut 57 about the axis thereof.

As shown in FIGS. 4 to 6, the feed screw 51 has a flange 51a formed around a middle portion thereof and having two through-holes 51b formed therein as extending therethrough axially of the feed screw 51. The feed screw 51 is preferably composed of a material having a coefficient of linear expansion smaller than that of the bed 108, more preferably a material having a coefficient of linear expansion of not greater than $4.0 \times 10^{-6}/°$ C.

Tubular sleeves 57a each having a length greater than the thickness of the flange 51a are respectively loosely fitted in the through-holes 51b and fixed to the work rest 103 by bolts 59 with the intervention of washers 58 provided at opposite ends thereof. Thus, the feed screw 51 is slightly movable axially and radially. The two through-holes 51b are disposed on horizontally opposite sides of the axis of the feed screw 51.

The first nut 52 and the second nut 57 are respectively supported rotatably about the axes thereof by thrust bearings (hereinafter referred to simply as "bearings") 53 and 58 each having an aligning function. Axial movements of the bearings 53 and 58 are respectively restricted by flanges formed around the first nut 52 and the second nut 57, and spacers 55 and 60.

The first nut 52 and the second nut 57 are respectively coupled with the driving motors 56 and 61 via couplings 54 and 59. When the first nut 52 and the second nut 57 are respectively rotated about the axes thereof by the first driving motor 56 and the second driving motor 61, the first nut 52 and the second nut 57 are moved axially with respect to the feed screw 51, so that the grinding wheel spindle stock 101 and the regulating wheel spindle stock 102 are respectively moved together with the first nut 52 and the first driving motor 56, and together with the second nut 57 and the second driving motor 61 along the feed screw 51.

As shown in FIG. 7, the bearings 58 (53) each include two bearing rings 58a, 58b (53a, 53b) disposed in opposed relation, rolling elements 58c (53c) provided between the bearing rings 58a, 58b (53a, 53b), and an aligning washer 58d (53d) abutting against a shoulder of the bearing ring 58a (53a). The abutment portion (shoulder) of the bearing ring 58a (53a) projects in a spherical configuration, and an abutment portion of the aligning washer 58d (53d) abutting against the abutment portion of the bearing ring 58a (53a) is recessed in a spherical configuration. The bearing ring 58a (53a) is aligned with the aligning washer 58d (53d) by the spherical configurations of these abutment portions.

In the centerless grinder 40, the middle portion of the feed screw 51 is retained in the work rest 103 provided on the center of the bed 108, so that the positional relationships of the grinding wheel spindle stock 101 and the regulating wheel spindle stock 102 with respect to the feed screw 51 can be maintained by the threading engagement irrespective of the thermal expansion of the bed 108 as in the aforesaid centerless grinder 1. As a result, the inter-axis distance between the grinding wheel 101a and the regulating wheel 102a is not influenced by the thermal expansion of the bed 58, but is kept substantially at the initial level. Thus, the reduction in the machining accuracy of the workpiece W can be minimized which may occur due to the thermal deformation of the bed 108.

Since the feed screw 51 is retained in a slightly axially and radially movable manner, the grinding wheel spindle stock 101 and the regulating wheel spindle stock 102 can smoothly be moved without the need for precisely aligning the first nut 52 and the second nut 57 with the guide means for guiding the grinding wheel spindle stock 101 and the regulating wheel spindle stock 102. Even if the first nut 52 and the second nut 57 are slightly misaligned with the guide means, the misalignment is accommodated by the slight movement of the feed screw 51. Thus, the grinding wheel spindle stock 101 and the regulating wheel spindle stock 102 can smoothly be moved. Even if the bed 108 is thermally deformed to be convexly curved upward, the deformation is accommodated by the slight movement of the feed screw 51, so that the deformation of the feed screw 51 is prevented which may otherwise occur due to the thermal deformation of the bed 108.

The grinding wheel spindle stock 101 and the regulating wheel spindle stock 102 are engaged with each other through the threading engagement of the first nut 52 and the second nut 57 with the single feed screw 51. With the feed screw 51 being slightly movable axially and radially, the positional relationship between the grinding wheel spindle stock 101 and the regulating wheel spindle stock 102 is kept constant unless the first nut 52 and the second nut 57 are rotated. Therefore, the grinding accuracy is not deteriorated by permitting the slight axial and radial movement of the feed screw 51.

Further, the first nut 52 and the second nut 57 are respectively retained by the bearings 53 and 58 each having the aligning function. Therefore, a load exerted on the feed screw 51 is alleviated by the aligning function even if the feed screw 51 is misaligned with the bearings 53, 58. As a result, the feed screw 51 can be prevented from being bent or deformed.

A difference between the outer diameter of the sleeves 57a and the inner diameter of the through-holes 51b is preferably not greater than several tens of micrometers, and a difference between the length of the sleeves 57a and the thickness of the flange 51a is preferably not greater than several tens of micrometers.

The flange 51a of the feed screw 51 is formed with the two through-holes 51b, which are disposed on horizontally opposite sides of the axis of the feed screw 51. This arrangement principally aims at the accommodation of vertical misalignment of the feed screw 51. If principal consideration is given to accommodation of horizontal misalignment of the feed screw 51, the through-holes 51b are preferably disposed on vertically opposite sides of the axis of the feed screw 51. If little consideration is given to the accommodation of the misalignment, four through-holes 51b may be circumferentially equidistantly formed in the flange 51a.

Figure 8:
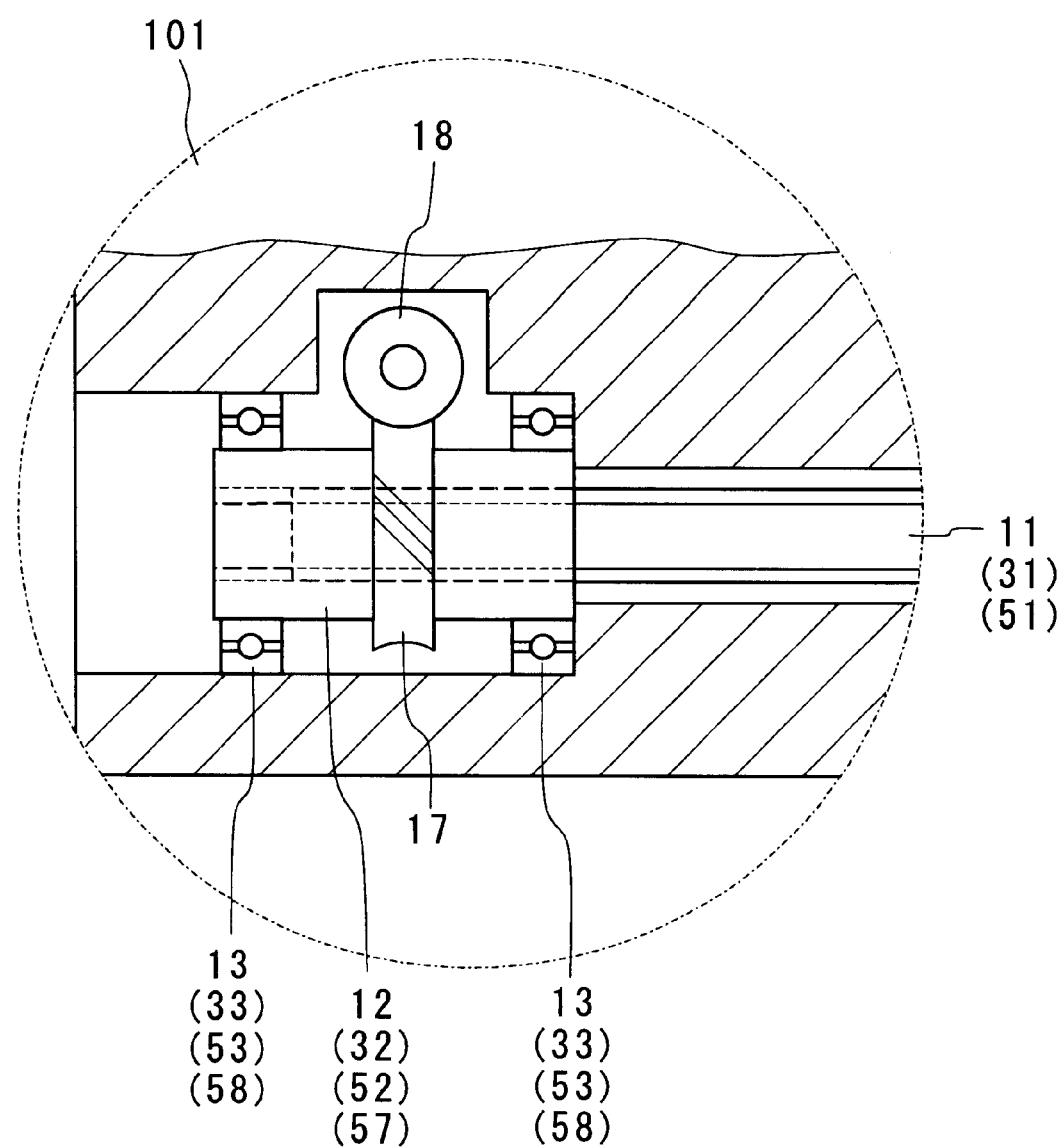
FIG. 8 is a front sectional view illustrating a feed device of a centerless grinder according to still another embodiment of the present invention.

While the embodiments of the present invention have thus been described, it should be understood that possible embodiments of the invention be not limited to those described above. In the centerless grinder 1 (20, 30) described above, the output shaft of the driving motor 15 (36, 56, 61) is coupled with the nut 12 (32, 52, 57) directly by the coupling 14 (34, 54, 59), but the coupling arrangement is not limited thereto. For example, the coupling arrangement may comprise a worm wheel 17 integrally formed with the nut 12 (32, 52, 57) and a worm 18 extending perpendicularly to the axis of the nut 12 (32, 52, 57) and meshed with the worm wheel 17, wherein the output shaft of the driving motor 15 (36, 56, 61) is connected to the worm 18 as shown in FIG. 8. This arrangement is effective where the driving motor 15 (36, 56, 61) cannot be disposed longitudinally of the feed screw 11 (31, 51).

Although the first driving motor 15 (36,56) and the second driving motor 15 (36, 61) are respectively fixed to the grinding wheel spindle stock 101 and the regulating wheel spindle stock 102, it is possible to employ an arrangement such that the first driving motor 15 (36, 56) and the second driving motor 15 (36, 61) are fixed to the bed 108 and the output shafts of the first driving motor 15 (36, 56) and the second driving motor 15 (36, 61) are respectively connected to the first nut 12 (32, 52) and the second nut 12 (32, 57) by spline joints so as to allow for axial movements of the first nut 12 (32, 52) and the second nut 12 (32, 52) with respective to the output shafts.

Although the grinding wheel spindle stock 51 and the regulating wheel spindle stock 52 are each driven by the feed device 10 (30) in the centerless grinder 1 (20) described above, either one of the grinding wheel spindle stock 51 and the regulating wheel spindle stock may be driven by the feed device 10 (30).

Industrial Applicability

As described above, the centerless grinder according to the present invention is advantageous to minimize the reduction in machining accuracy even if the bed is thermally deformed due to heat generated during grinding.

What is claimed is:

1. A centerless grinder which comprises: a bed; a grinding wheel spindle stock and a regulating wheel spindle stock disposed on the bed in opposed relation; a work rest fixed onto the bed between the grinding wheel spindle stock and the regulating wheel spindle stock for supporting a workpiece between the grinding wheel spindle stock and the regulating wheel spindle stock; at least one of the grinding wheel spindle stock and the regulating wheel spindle stock serving as a feedable wheel spindle stock which is movable in a direction toward and away from the other wheel spindle stock; and a feed device for moving the feedable wheel spindle stock in the direction, wherein the feed device comprises:

a feed screw having one end fixed onto the bed between the grinding wheel spindle stock and the regulating wheel spindle stock, and disposed as extending in the direction of the movement;

a nut retained in the feedable wheel spindle stock in threading engagement with the feed screw so that an axial movement thereof along the feed screw is restricted and a rotational movement thereof about an axis thereof is permitted; and a driving motor for rotating the nut about the axis thereof.

2. A centerless grinder as set forth in claim 1, wherein the grinding wheel spindle stock and the regulating wheel spindle stock respectively serve as feedable wheel spindle stocks which are movable in a direction toward and away from each other, wherein the feed device comprises:

a single feed screw disposed as extending in the direction of the movements of the feedable wheel spindle stocks and having a middle portion fixed onto the bed between the grinding wheel spindle stock and the regulating wheel spindle stock;

a first nut retained in the grinding wheel spindle stock in threading engagement with one side of the feed screw so that an axial movement thereof along the feed screw is restricted and a rotational movement thereof about an axis thereof is permitted;

a second nut retained in the regulating wheel spindle stock in threading engagement with the other side of the feed screw so that an axial movement thereof along the feed screw is restricted and a rotational movement thereof about an axis thereof is permitted;

a first driving motor for rotating the first nut about the axis thereof; and a second driving motor for rotating the second nut about the axis thereof.

3. A centerless grinder as set forth in claim 1 or 2, wherein the feed screw is fixed to the work rest.

4. A centerless grinder as set forth in claim 2, wherein the middle portion of the feed screw is retained in a slightly axially and/or radially movable manner by a retainer provided on the bed between the grinding wheel spindle stock and the regulating wheel spindle stock.

5. A centerless grinder as set forth in claim 2, wherein the middle portion of the feed screw is retained in a slightly axially and/or radially movable manner by the work rest.

6. A centerless grinder as set forth in any of claims 2, 4 and 5, wherein the first nut and the second nut are respectively retained in the grinding wheel spindle stock and the regulating wheel spindle stock via thrust bearings each having an aligning function.

7. A centerless grinder as set forth in any of claims 1, 2, 4 and 5, wherein the driving motor is fixed to the feedable wheel spindle stock.

8. A centerless grinder as set forth in any of claims 1, 2, 4 and 5, wherein the feed screw is composed of a material having a coefficient of linear expansion smaller than that of the bed.

* * * * *